United States Patent
Soga et al.

(10) Patent No.: US 9,455,481 B2
(45) Date of Patent: Sep. 27, 2016

(54) BATTERY TEMPERATURE CONTROL DEVICE

(75) Inventors: Tsutomu Soga, Machida (JP); Atsushi Takano, Sagamihara (JP); Naoki Yamamoto, Kawasaki (JP); Takashi Iimori, Tokyo (JP); Kazuhiko Okino, Yokohama (JP); Hisashi Niioka, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 195 days.

(21) Appl. No.: 13/979,762

(22) PCT Filed: Mar. 1, 2012

(86) PCT No.: PCT/JP2012/055204
§ 371 (c)(1),
(2), (4) Date: Jul. 15, 2013

(87) PCT Pub. No.: WO2012/124485
PCT Pub. Date: Sep. 20, 2012

(65) Prior Publication Data
US 2013/0302658 A1    Nov. 14, 2013

(30) Foreign Application Priority Data

Mar. 11, 2011   (JP) ................................. 2011-054082

(51) Int. Cl.
*B60L 11/18*   (2006.01)
*H01M 10/625*   (2014.01)
(Continued)

(52) U.S. Cl.
CPC ...... *H01M 10/5006* (2013.01); *B60L 11/1861* (2013.01); *B60L 11/1875* (2013.01);
(Continued)

(58) Field of Classification Search
CPC .... B60W 20/00; B60W 10/26; B60W 10/08; B60W 2510/244; B60W 2510/246; B60L 11/1861; B60L 11/187; B60L 11/1851; B60L 11/1862; B60L 11/1809; B60L 11/1824; B60L 11/1894; H01M 10/5006; H01M 10/5016; H01M 10/502; H01M 2220/20; Y04S 10/126; H02J 7/0027
USPC ........................................................ 429/62
See application file for complete search history.

(56) References Cited

U.S. PATENT DOCUMENTS 7,413,827 B2   8/2008   Inui
8,417,403 B2   4/2013   Iida et al.
(Continued)

FOREIGN PATENT DOCUMENTS

DE   101 04 056 A1   8/2002
JP   2000-040536 A   2/2000
(Continued)

*Primary Examiner* — Lucas J O Donnell
(74) *Attorney, Agent, or Firm* — Foley & Lardner LLP

(57) ABSTRACT

At a timing of time t1 battery temperature Tbat lowers to Tbat_start and a warm-up request occurs, SOC at this time is a level, like time t2, which allows a vehicle to travel by itself up to a battery charging facility and allows a battery charger to be connected to the battery charging facility. Since a warm-up permission judging value is set to SOCs_low that is substantially 0 at time t1, in response to judgment of "SOC≥SOCs_low (≈0)", warm-up of the battery is carried out from time t1 as shown by a solid line, then Tbat can be increased from time t1. A battery charge time can be thus shortened. With this, in order that the battery does not freeze while the battery is unused, a control that warms up the battery by a battery-driven heater is performed while shortening the battery charge time.

4 Claims, 4 Drawing Sheets

(51) Int. Cl.
*H01M 10/60* (2014.01)
*H01M 10/615* (2014.01)
*H02J 7/04* (2006.01)
*H01M 10/44* (2006.01)
*H01M 10/48* (2006.01)
*H01M 10/635* (2014.01)

(52) U.S. Cl.
CPC ......... *H01M10/443* (2013.01); *H01M 10/486* (2013.01); *H01M 10/615* (2015.04); *H01M 10/625* (2015.04); *H01M 10/635* (2015.04); *H02J 7/047* (2013.01); *Y02T 10/705* (2013.01); *Y02T 10/7005* (2013.01); *Y02T 10/7044* (2013.01)

(56) References Cited

U.S. PATENT DOCUMENTS

2005/0264257 A1   12/2005   Inui
2010/0324765 A1*  12/2010   Iida et al. ........................ 701/22
2011/0316486 A1*  12/2011   Inaba et al. ................... 320/150

FOREIGN PATENT DOCUMENTS

| | | |
|---|---|---|
| JP | 2003-203679 A | 7/2003 |
| JP | 2005-339980 A | 12/2005 |
| JP | 2008-016229 A | 1/2008 |
| JP | 2009-044887 A | 2/2009 |
| JP | 2009-248822 A | 10/2009 |
| JP | 2011-015544 A | 1/2011 |

* cited by examiner

# US 9,455,481 B2

BATTERY TEMPERATURE CONTROL DEVICE

TECHNICAL FIELD

The present invention relates to a battery temperature control device that is capable of avoiding a decrease of temperature of a battery used in a cold district, especially while the battery is unused.

BACKGROUND ART

It is conceivable that the battery mounted in an electric vehicle is used in the cold district, and a battery electrolyte might freeze while the battery is unused.

When the temperature of the battery lowers, although a battery charge state SOC does not lower, a usable input/output power for the battery decreases due to an increase of an internal resistance. Further, when the battery electrolyte freezes, the usable input/output power of the battery finally becomes 0 (zero), then in a case of the electric vehicle that uses the battery as a travelling energy source, the electric vehicle gets into a travel-impossible state.

Thus, the battery temperature control device, which controls the battery temperature by warming up the battery by a heater before the battery temperature lowers to a temperature that causes a state in which such problem of the usable input/output power of the battery occurs, is required.

As a battery temperature control device that controls the battery temperature by warming up the battery by the heater, a related art battery temperature control device disclosed, for instance, in a Patent Document 1 has been proposed.

This proposed related art battery temperature control device is a device that performs the temperature control of the vehicle-mounted battery and warms up the battery by the heater when an outside air temperature is lower than a minimum temperature upon OFF-operation of an ignition switch.

Here, the Patent Document 1 discloses, in a drawing, that the battery charge state SOC is inputted to a block that governs the above battery temperature control. And it can be read that when this battery charge state SOC is a setting value or greater, the related art permits the warm-up of the battery.

In the Patent Document 1, however, there is no detailed disclosure nor mention of the setting value of the battery charge state at all. Then, it is plausible that this setting value of the battery charge state is interpreted as a fixed value.

Further, in the case where the setting value of the battery charge state is the fixed value, such a problem explained below arises.

That is, even if a temperature at the ignition switch OFF is a low temperature at which the battery should be warmed up, while the battery charge state is less than the fixed setting value, the warm-up of the battery by the heater is not permitted.

Then, during this state, the battery temperature further lowers, and the usable input/output power further decreases. As a consequence, there arises a problem that a charge current when the vehicle travels up to a battery charging facility and the battery is charged becomes small and thus taking a long time for the charging.

CITATION LIST

Patent Document

Patent Document 1: Japanese Patent Provisional Publication Tokkai No. 2003-203679

SUMMARY OF THE INVENTION

In the present invention, for instance, in a case where the battery is in a state in which the vehicle can travel up to the nearest battery charging facility as described above, namely, in a case where the battery state is such that a condition allowing the battery to be charged exists, even if the battery warm-up by the heater is carried out, the vehicle can travel by itself up to the battery charging facility and the charge-capable condition of the battery exists. For this reason, evil effects due to the carrying out of the battery warm-up by the heater do not appear, then there is no need to forbid the warm-up of the battery even if the battery charge state is less than the setting value. From this viewpoint, an object of the present invention is to provide a battery temperature control device that is capable of solving the problem about the long charging time, by embodying the above idea.

To achieve this object, the battery temperature control device according to the present invention is configured as follows.

First, the battery temperature control device as a prerequisite for the present invention will be explained.

The battery temperature control device controls a temperature of a battery by warming up the battery by a battery-driven heater on condition that when the battery temperature is less than a predetermined temperature, a charge state of the battery is a setting battery charge state or greater.

The present invention is characterized in that the battery temperature control device is provided with the following battery state judging section or unit and setting battery charge state decreasing section or unit.

A battery state judging section judges whether or not a battery state is in such battery state that a charge-capable condition of the battery exists; and a setting battery charge state decreasing section decreases the setting battery charge state, when the battery state in which the charge-capable condition of the battery exists is judged by the battery state judging section.

According to the battery temperature control device of the present invention, when the battery state is the battery state in which the charge-capable condition of the battery exists, the battery temperature control device decreases the setting battery charge state. Then on condition that the battery charge state is equal to or greater than this decreased setting battery charge state, the warm-up of the battery by the battery-driven heater when the battery is becomes less than the predetermined temperature is performed.

Therefore, when the battery state is the battery state in which the charge-capable condition of the battery exists, the warm-up of the battery by the battery-driven heater when the battery is becomes less than the predetermined temperature is immediately permitted.

Accordingly, a further battery temperature decrease is avoided and the battery temperature increases during this warm-up. With this battery temperature increase, the usable input/output power is increased. As a consequence, the battery charge-capable condition is secured (the battery is brought to a state in which the battery charge is possible), and a charge current when charging the battery can be large, thereby shortening a time required to charge the battery. The problem that it takes a long time to charge the battery can therefore be solved.

DESCRIPTION OF EMBODIMENTS

In the following description, an embodiment of the present invention will be explained with reference to the drawings.

Figure 1:
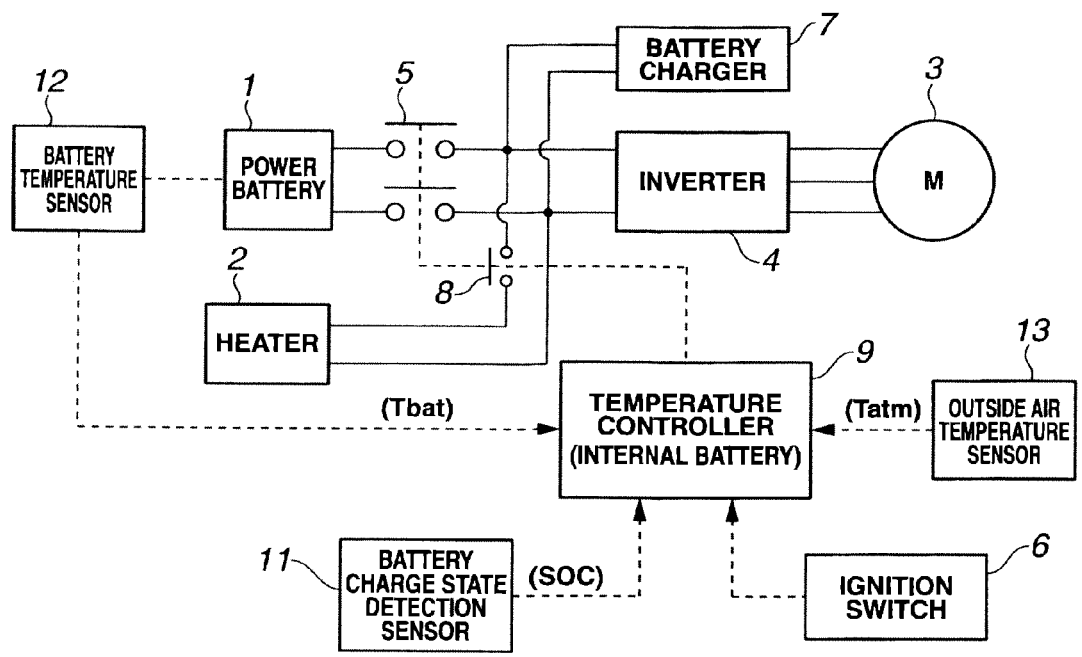
FIG. 1 is a control system diagram schematically showing a battery temperature control device of an embodiment of the present invention.

FIG. 1 is a control system diagram of a battery temperature control device of an embodiment of the present invention. In the present embodiment, this battery temperature control device is a device for controlling temperature of a high rate battery 1 (or a power battery 1) of an electric vehicle such as an electric car and a hybrid vehicle.

The power battery 1 is a large-capacity battery provided for drive of a motor. The large-capacity battery is formed, as an integral component, so that a plurality of battery shells are stacked (or arranged) as a unit of a battery module and a plurality of the battery modules are arranged as one set.

In FIG. 1, a reference sign 2 denotes a heater to perform a temperature control of the battery 1. This heater 2 is a heater that is provided close to the battery module and set along a stack direction of the battery shell of the battery module then warms up the battery 1.

In FIG. 1, a reference sign 3 denotes an electric motor used for drive of the travel of the electric vehicle. This electric motor 3 is electrically connected to the battery 1 through an inverter 4.

A ma relay switch 5 inserted on an electric line between the inverter 4 and the battery 11. This main relay switch 5 is a switch that opens/closes in synchronization with or in response to an ignition switch 6 of the electric vehicle through a drive controller (not shown). The main relay switch 5 closes when the ignition switch 6 is ON, and the main relay switch 5 opens when the ignition switch 6 is OFF.

During the closed state of the main relay switch 5 in synchronization with ON of the ignition switch 6, a DC power from the battery 1 is converted from DC to AC by the inverter 4, and is outputted to the electric motor 3 under a control of the inverter 4, then the electric vehicle can travel by drive of the electric motor 3.

During the open state of the main relay switch 5 in synchronization with OFF of the ignition switch 6, the DC power from the battery 1 is not outputted to the electric motor 3, then the electric vehicle can be held in a vehicle stop state by halt of the electric motor 3.

A battery charger 7 is connected and provided between a DC side of the inverter 4 and the main relay switch 5. When this battery charger 7 is connected to an external power supply of a charging station or of a battery charging facility provided at a home, the main relay switch 5 is closed by a charge controller (not shown), thereby charging the battery 1 by the external power supply.

The temperature control device of the battery 1 will be explained below.

As shown in FIG. 1, the heater 2 provided close to the battery module along the stack direction of the battery shell, to perform the temperature control of the battery 1 as mentioned above, is electrically connected between the DC side of the inverter 4 and the main relay switch 5. A heater switch 8 is inserted on an electric line between this connection part and the heater 2.

Open/close of the heater switch 8 is controlled by a temperature controller 9 (the temperature controller 9 has an internal battery or cell and is capable of self-starting) that governs the temperature control of the battery 1.

Further, during the open state of the main relay switch 5 in synchronization with OFF of the ignition switch 6, this temperature controller 9 also controls open/close of the main relay switch 5. At this time, when the temperature controller 9 closes the heater switch 8, the temperature controller 9 also closes the main relay switch 5 in synchronization with "close" of the heater switch 8 then turns the heater 2 ON. When the temperature controller 9 opens the heater switch 8, the temperature controller 9 also opens the main relay switch 5 in synchronization with "open" of the heater switch 8 then turns the heater 2 OFF.

In order to perform the ON/OFF control of the heater 2 through the above synchronization close/open of the heater switch 8 and the main relay switch 5, the temperature controller 9 inputs an ON/OFF signal of the ignition switch 6, a signal from a battery charge state detection sensor 11 that detects a battery charge state SOC of the battery 1, a signal from a battery temperature sensor 12 that senses a temperature Tbat of the battery 1 and a signal from an outside air temperature sensor 13 that senses an outside air temperature Tatm.

The temperature controller 9 executes, on the basis of these input information, a control program shown in FIG. 2, and performs the temperature control of the battery 1 as follows.

At step S11, a check is made as to whether or not the ignition switch 6 is in the OFF state.

When the ignition switch 6 is not in the OFF state, a current state is a state in which the main relay switch 5 is closed in synchronization with or in response to "ON" of the ignition switch 6 and the vehicle travel by the drive of the electric motor 3 is allowed. The control is therefore terminated as it is, and the routine exits from a loop of FIG. 2.

When judging that the ignition switch 6 is in the OFF state at step S11, at step S12, a check is made as to whether or not this time is a first time after the ignition switch 6 is turned OFF, namely that a check is made as to whether or not the current state is a state just after the ignition switch 6 is turned OFF from ON.

When the current state is the state just after the ignition switch 6 is turned OFF, at step S13, a check is made as to whether or not the battery temperature Tbat is less than a warm-up start temperature Tbat_start.

This warm-up start temperature Tbat_start is a setting value for judging whether the battery 1 needs warming or not in order to prevent a battery electrolyte of the battery 1 from freezing. For example, the warm-up start temperature Tbat_start is set as follows.

When the battery temperature Tbat becomes a temperature that is lower than e.g. approx. −25° C.~−30° C., the battery electrolyte freezes, and a usable input/output power of the battery 1 becomes 0 (zero).

In order for the vehicle not to get into such worst situation, it is preferable to warm up the battery 1 by the heater 2 from a time when the battery temperature Tbat becomes a low temperature of e.g. approx. −20° C. with a margin provided, and it is far preferable to warm up the battery 1 by the heater 2 from a time when the battery temperature Tbat becomes a low temperature of e.g. approx. −17° C. with a margin provided.

Thus, in the present embodiment, as the warm-up start temperature Tbat_start, for instance, it is set to the temperature of approx. −17° C.

When judging that the battery temperature Tbat is not less than the warm-up start temperature Tbat_start (not Tbat<Tbat_start) at step S13, that is, in a case where the battery temperature Tbat is such high temperature that there is no risk that the battery electrolyte will freeze for the time being, at step S14, a time required for the battery temperature Tbat to lower to the warm-up start temperature Tbat_start is estimated from a combination of the battery temperature Tbat and the outside air temperature Tatm. Then, this time is set as a sleep time (a next controller startup time) Δt that is a time elapsing until the temperature controller 9 starts up next time and the control program of FIG. 2 is executed.

Here, with respect to the time required for the battery temperature Tbat to lower to the warm-up start temperature Tbat_start, for instance, a case where the battery 1 cools off and becomes cold most or quite quickly is taken into consideration on the basis of experimental data etc., and this case is previously determined for each combination of the battery temperature Tbat and the outside air temperature Tatm and a map is created. Then, on the basis of this map, the time required for the battery temperature Tbat to lower to the warm-up start temperature Tbat_start can be determined by retrieving a time from the map of the combination of the battery temperature Tbat and the outside air temperature Tatm.

At next step S15, the temperature controller 9 opens the heater switch 8 and the main relay switch 5, thereby turning the heater 2 OFF and bringing the current state to a sleep state.

When the current state goes into the sleep state in which the heater 2 is turned OFF by "open" of the heater switch 8 and the main relay switch 5 by the temperature controller 9 by the fact that the above control by the loop including steps S11 to S15 is performed during the OFF state of the ignition switch 6, the temperature controller 9 measures or calculates an elapsed time from a time when the current state goes into the sleep state by a built-in or a stored timer. Then the temperature controller 9 maintains the sleep state until the next controller startup time Δt set at step S14 elapses.

When the next controller startup time Δt elapses after the current state goes into the sleep state, the temperature controller 9 executes the control program of FIG. 2 again (the temperature controller 9 executes "wake-up").

Since "the first time" is not judged at step S12 at the time of the wake-up, the control routine proceeds to step S16. Then at this step S16, a judging result that the above wake-up has been executed is received, and the control routine proceeds to step S13.

In a case where it is judged that the battery temperature Tbat is not less than the warm-up start temperature Tbat_start yet at step S13 even by the sleep state of the time Δt, the control routine proceeds to step S14 and step S15 again. Then the sleep state is further continued by a next controller startup time Δt that is newly set at step S14.

In the meantime, when the battery temperature Tbat becomes less than the warm-up start temperature Tbat_start, it is judged that the battery temperature lowers at step S13 (step S13 judges a decrease of the battery temperature), and the control routine proceeds to step S17. At this step S17, a check is made as to whether or not the battery temperature Tbat is less than a freeze judging temperature Tbat_low.

This freeze judging temperature Tbat_low is a setting value for judging whether or not the battery electrolyte of the battery 1 freezes or goes into a state just before the freezing then the usable input/output power of the battery 1 becomes substantially 0 (zero), namely, for judging whether the warm-up of the battery 1 by the heater 2 is possible or not. For example, the freeze judging temperature Tbat_low is set as follows.

When the battery temperature Tbat becomes a low temperature of e.g. approx. −25° C.~−30° C., the battery electrolyte freezes, and the battery 1 can not operate the heater 2, then this makes the warm-up (the temperature control) of the battery 1 impossible. Because of this, in the present embodiment, as the freeze judging temperature Tbat_low, it is set to the temperature of approx. −25° C.

In a case where it is judged that the battery temperature Tbat is less than the freeze judging temperature Tbat_low (Tbat<Tbat_low) (the battery 1 can not operate the heater 2) at step S17, at step S14, on the basis of a different map from the above-mentioned map about the estimated time of ""Tbat<Tbat_start" is satisfied" that is set at the same step S14, also on the basis of a map about a time required for the battery electrolyte to thaw out, a time required for thawing-out of the battery electrolyte is estimated from the combination of the battery temperature Tbat and the outside air temperature Tatm. Then, this time is set as a sleep time (a next controller startup time) Δt that is a time elapsing until the temperature controller 9 starts up next time and the control program of FIG. 2 is executed.

Also regarding the map of the time required for the battery electrolyte to thaw out, in the same manner as the map of the time required for the battery temperature Tbat to lower to the warm-up start temperature Tbat_start (Tbat<Tbat_start), the map of the time required for the battery electrolyte to thaw out can be previously determined on the basis of data of a case where the outside air temperature Tatm increases.

At next step S15, the temperature controller 9 opens the heater switch 8 and the main relay switch 5, thereby turning the heater 2 OFF and bringing the current state to the sleep state.

When the current state goes into the sleep state in which the heater 2 is turned OFF by "open" of the heater switch 8 and the main relay switch 5 by the temperature controller 9 by the fact that the above control by the loop including steps S11, S12, S16, S13, S17, S14 and S15 is performed, the temperature controller 9 measures or calculates an elapsed time from a time when the current state goes into the sleep state by the built-in or the stored timer. Then the temperature controller 9 maintains the sleep state until the next controller startup time Δt set at step S14 elapses.

When the next controller startup time Δt elapses after the current state goes into the sleep state, the temperature controller 9 executes the control program of FIG. 2 again (the temperature controller 9 executes "wake-up").

In a case where it is judged that the battery temperature Tbat is still less than the freeze judging temperature Tbat_low at step S17 even by the sleep state of the time Δt, the control routine proceeds to step S14 and step S15 again. Then the sleep state is continued by a next controller startup time Δt that is newly set at step S14.

In the meantime, when the battery temperature Tbat becomes the freeze judging temperature Tbat_low or higher (the battery 1 gets into a state capable of operating the heater 2 due to the thawing-out of the battery electrolyte), it is judged that the battery temperature increases at step S17 (step S17 judges an increase of the battery temperature), and the control routine proceeds to step S18. At this step S18, a check is made as to whether or not battery drive of the heater 2 (the warm-up of the battery 1) is permitted according to whether "1" or "0" of a warm-up permission flag FLAG that is set by a control program shown in FIG. 3.

A judging manner of the warm-up permission flag FLAG by the control program of FIG. 3 will explained below.

At step S21, a check is made as to whether or not a battery state when the battery temperature Tbat is less than the warm-up start temperature Tbat_start and also there is a warm-up request is in such battery state (a battery charge state SOC) that a charge-capable condition of the battery 1 exists.

Thus, step S21 corresponds to a battery state judging section or unit of the present invention.

Here, as a matter of course, the battery state (called the battery charge state SOC) that allows the charge-capable condition of the battery 1 means a battery state in which the battery charger 7 shown in FIG. 1 is connected to the battery charging facility. Further, for instance, in the case of the electric car, this battery state also means a battery state in which such battery charge state SOC (such battery charge amount) as to allow the electric car to travel by itself up to the nearest battery charging facility and allow the battery charger 7 to be connected to the battery charging facility is left. In addition, in the case of the hybrid vehicle, this battery state also means a battery state in which such battery charge state SOC (such battery charge amount) as to allow the hybrid vehicle to travel by itself up to the nearest battery charging facility and allow the battery charger 7 to be connected to the battery charging facility is left, but a remaining fuel amount of an engine is 0 (zero).

In a case of these battery states, even if the warm-up of the battery 1 by driving the heater 2 using the battery 1 is carried out, since the battery 1 is already in the charge-capable state, or since the battery 1 is in the battery state allowing the vehicle to travel by itself up to the battery charging facility and allowing the charge-capable condition of the battery 1, evil effects due to the carrying out of the battery warm-up by the heater 2 do not appear, then there is no need to forbid the warm-up of the battery 1.

Thus, in a case where it is judged, at step S21, that the battery state is in such battery state (the battery charge state SOC) that the charge-capable condition of the battery 1 exists, the control routine proceeds to step S22. At step S22, as a battery charge state setting value (that corresponds to a setting battery charge state of the present invention) for warm-up permission judgment that judges whether to permit warm-up of the battery 1 or not, SOCs_low that is substantially 0 (zero) is set and used, then a check is made as to whether or not the battery charge state SOC is this warm-up permission judging value SOCs_low (≈0) or greater.

Therefore, step S22 corresponds to a setting battery charge state decreasing section or unit.

In a case where it is judged that the battery state is "SOC≥SOCs_low" at step S22, since the warm-up of the battery 1 by the heater 2 can be permitted, at step S23, the warm-up permission flag FLAG is set to "1".

In a case where it is judged that the battery state is "SOC<SOCs_low" at step S22, since the warm-up of the battery 1 by the heater 2 should not be permitted, at step S24, the warm-up permission flag FLAG is set to "0".

In a case where it is judged, at step S21, that the battery state is not in such battery state (the battery charge state SOC) that the charge-capable condition of the battery 1 exists, the control routine proceeds to step S25. At step S25, as a battery charge state setting value (that corresponds to a setting battery charge state of the present invention) for warm-up permission judgment that judges whether to permit the warm-up of the battery 1 or not, SOCs_high (e.g. 30%) that is a regular or normal amount value is set and used, then a check is made as to whether or not the battery charge state SOC is this warm-up permission judging value SOCs_high or greater.

In a case where it is judged that the battery state is "SOC≥SOCs_high" at step S25, since the warm-up of the battery 1 by the heater 2 can be permitted, at step the warm-up permission flag FLAG is set to "1".

In a case where it is judged that the battery state is "SOC<SOCs_high" at step S25, since the warm-up of the battery 1 by the heater 2 should not be permitted, at step 324, the warm-up permission flag FLAG is set to "0".

Figure 2:
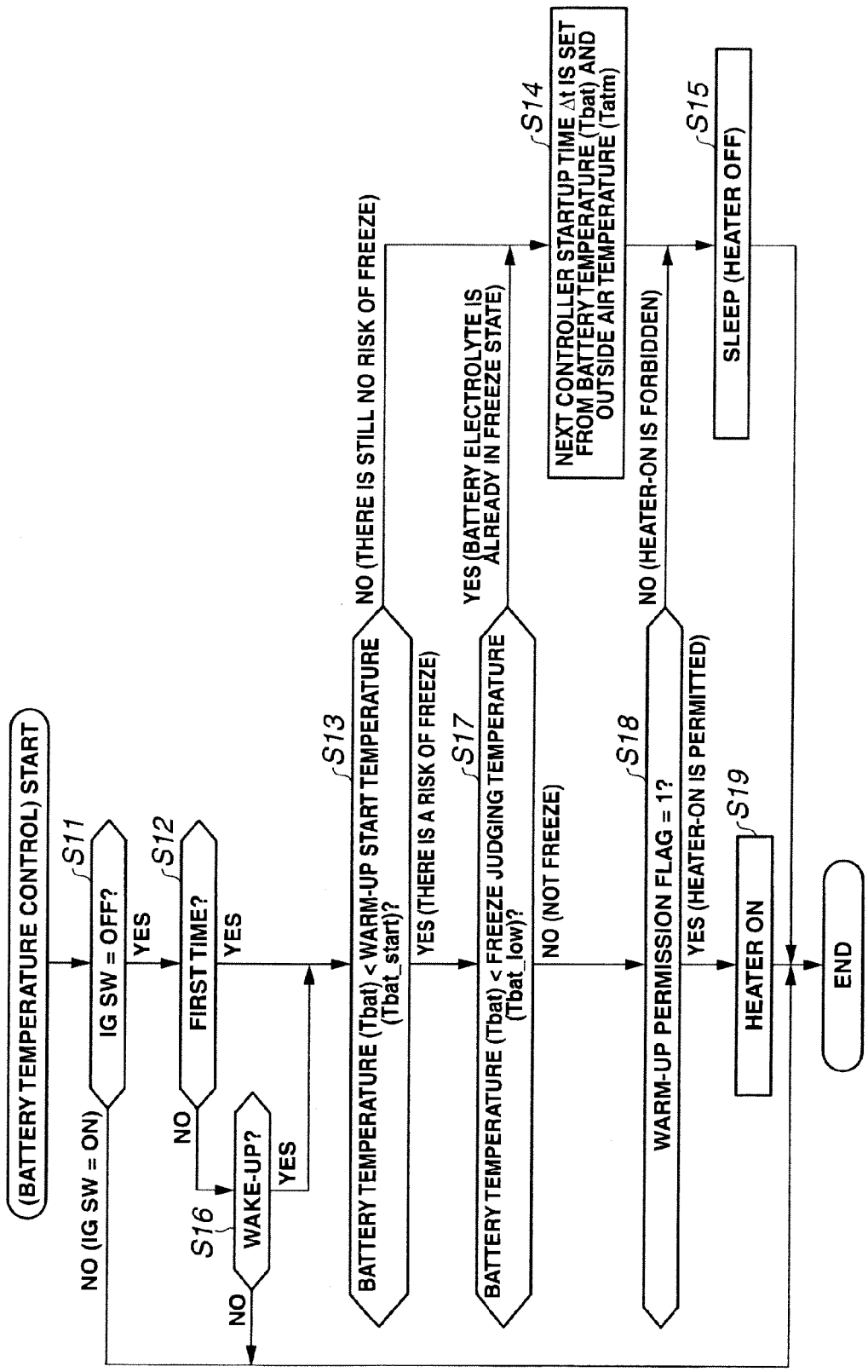
FIG. 2 is a flow chart of a battery temperature control program executed by a temperature controller shown in FIG. 1.
Figure 3:
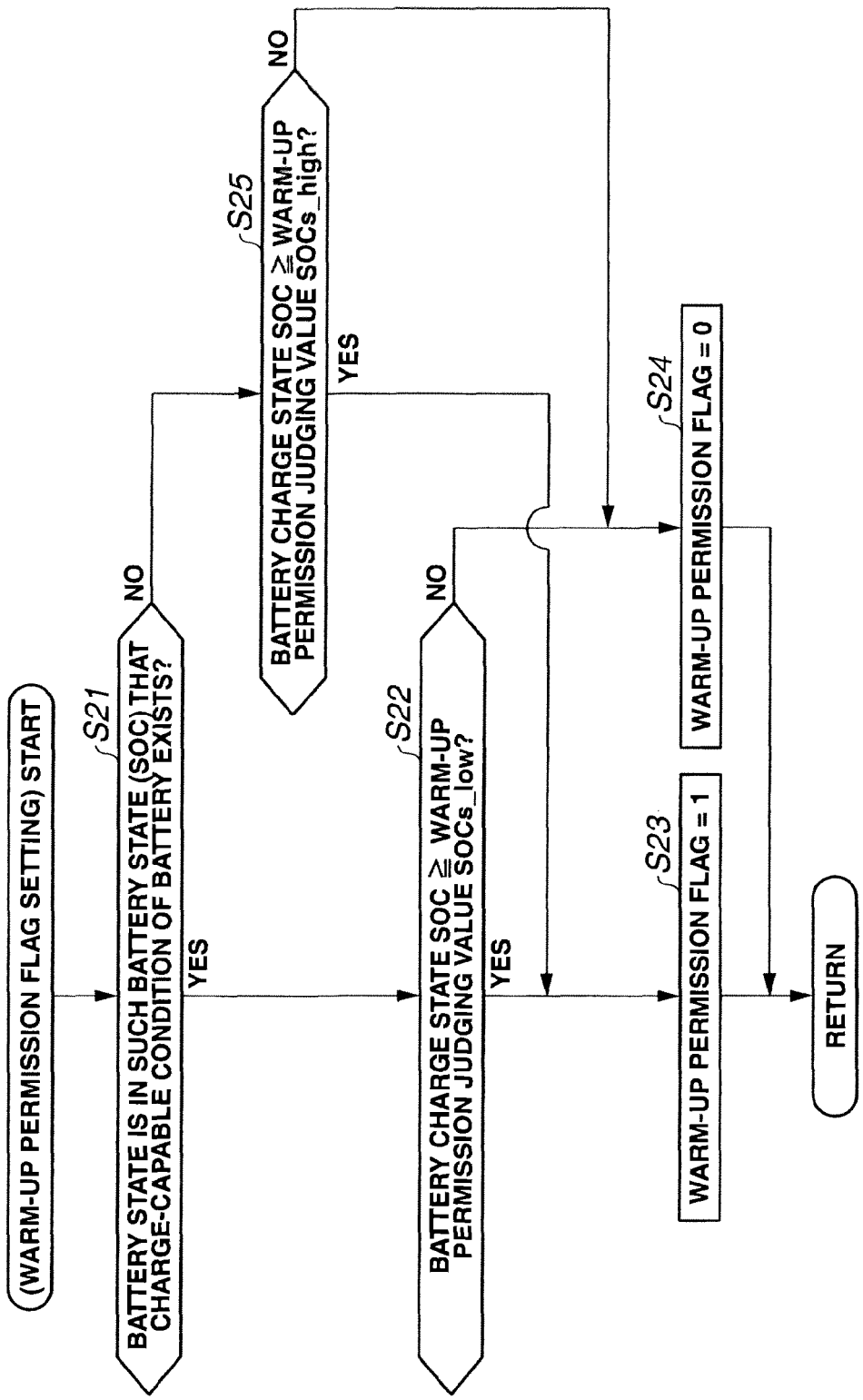
FIG. 3 is a flow chart showing a sub-routine of a setting operation of a warm-up permission flag during execution of the battery temperature control program of FIG. 2.

At step S18 in FIG. 2, a check is made as to whether or not the battery drive of the heater 2 (the warm-up of the battery 1) is permitted according to whether "1" or "0" of the warm-up permission flag FLAG that is set by the control program of FIG. 3 in the above manner.

When the warm-up permission flag FLAG is "FLAG=0" (i.e. in a case where the warm-up of the battery 1 by the battery drive of the heater 2 is not permitted), the temperature controller 9 executes step S15 (the temperature controller 9 opens the heater switch 8 and the main relay switch 5), then sets the current state to the sleep state in which the heater 2 is turned OFF.

When the warm-up permission flag FLAG is "FLAG=1" (i.e. in a case where the warm-up of the battery 1 by the battery drive of the heater 2 is permitted), the control routine proceeds to step S19 by the temperature controller 9, then by "close" of the heater switch 8 and the main relay switch 5, the heater 2 is operated by power from the battery 1 and the battery 1 is warmed up.

When the temperature of the battery 1 increases by the warm-up by the heater 2 and the battery temperature Tbat is equal to or higher than the warm-up start temperature Tbat_start, this battery temperature increase is judged by step S13, and the control routine proceeds to step S14 and step S15. As a consequence, the temperature controller 9 maintains the sleep state for the next controller startup time Δt set at step S14. Then when the next controller startup time Δt elapses, the temperature controller 9 executes the control program of FIG. 2 again (the temperature controller 9 executes "wake-up"), and repeats the above battery temperature control.

According to the above-explained battery temperature control of the present embodiment, during an unused state of the battery 1 by "OFF" of the ignition switch 6, the temperature control of the battery 1 is performed as follows.

While the battery temperature Tbat is equal to or higher than the warm-up start temperature Tbat_start (step S13), namely while there is no risk that the battery electrolyte freezes, the time required for the battery temperature Tbat to be less than the warm-up start temperature Tbat_start is estimated from the combination of the battery temperature Tbat and the outside air temperature Tatm, and this time is determined as the next controller startup time Δt (step S14). When this next controller startup time Δt elapses, by the wake-up of the control program shown in FIG. 2, at step S13, a check is made as to whether or not the battery temperature Tbat_lowers to the temperature that is less than the warm-up start temperature Tbat_start. Then when this battery temperature lowering arises (Tbat is "Tbat<Tbat_start"), the heater 2 is driven by the battery 1 and the warm-up of the battery 1 is carried out (step S19).

Therefore, even if the operation of the heater is not performed at a start of the temperature control of the battery 1, when the next controller startup time Δt elapses, by the wake-up, at step S13, a check is made again as to whether or not the battery temperature Tbat lowers to the temperature that is less than the warm-up start temperature Tbat_start (a judgment of necessity of the warm-up by the heater 2 is made).

Thus, even if at first, the operation of the heater 2 is not performed due to the fact that Tbat is "Tbat≥Tbat_start" (at step S13), when Tbat is "Tbat<Tbat_start" (at step S13) due to the temperature lowering afterwards, the temperature of the battery 1 can be surely controlled by the warm-up by the heater 2 (step S19).

Accordingly, it is possible to avoid the battery 1 being left at the temperature that is less than the warm-up start temperature Tbat_start, and such worst situation that the battery electrolyte freezes can be prevented.

Further, the above effects can be obtained by carrying out the warm-up of the battery 1 by the heater 2 only in the case where "Tbat<Tbat_start" is newly judged at step S13 by the wake-up of the control program shown in FIG. 2 after the next controller startup time Δt elapses. Thus, during the unused state of the battery 1 by "OFF" of the ignition switch 6, the heater 2 is operated only when really necessary (only when "Tbat<Tbat_start" is judged), and the above effects can be obtained with minimum electric power consumption, which can keep, for long time, the battery charge state SOC of the battery 1 at a level that allows the vehicle travel.

In the present embodiment, the warm-up of the battery 1 by the heater 2 at step S19 is permitted only when judging that the warm-up permission flag FLAG is "1" at step S18, and this warm-up permission flag FLAG is set to "1" or "0" in the above-described manner by the control program of FIG. 3. Consequently, effects explained below with reference to FIG. 4 can be obtained.

Figure 4:
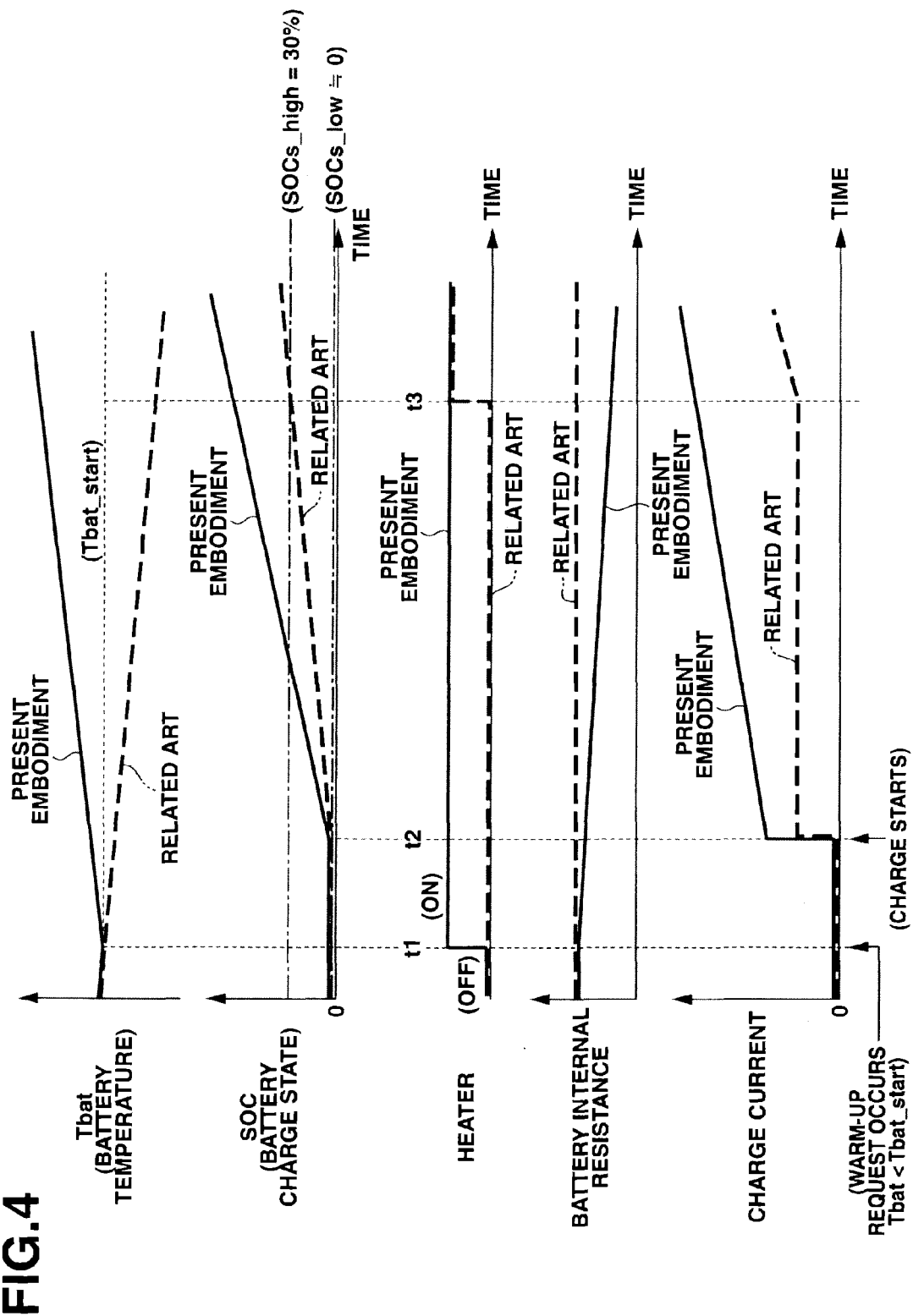
FIG. 4 shows time charts of the operation of the battery temperature control by FIGS. 2 and 3, which are shown with the operation of the present invention being compared with an operation of the related art battery temperature control.

FIG. 4 shows time charts of the operation of a case where at time t1, the battery temperature Tbat lowers to the warm-up start temperature Tbat_start and a warm-up request occurs, and the battery charge state SOC at this time is a level, like time t2, which allows the vehicle to travel by itself up to the battery charging facility and allows the battery charger 7 to be connected to the battery charging facility (such level that the charge-capable condition of the battery 1 exists).

In the related art, regardless of the battery charge state SOC at time t1 of the occurrence of the warm-up request according to "Tbat<Tbat_start", since the warm-up permission judging value of the battery charge state SOC is the fixed value SOCs_high of e.g. 30%, as shown by each broken line in FIG. 4, the warm-up of the battery 1 by the battery drive (ON) of the heater 2 is finally started at time t3 at which SOC is "SOC≥SOCs_high" by the charge from time t2 as shown also by the broken line.

Because of this, even though the battery charge state SOC at the warm-up request occurrence time t1 is the level, like time t2, which allows the vehicle to travel by itself up to the battery charging facility and allows the battery charger 7 to be connected to the battery charging facility (such level that the charge-capable condition of the battery 1 exists) and also the warm-up of the battery 1 by the battery drive of the heater 2 from the warm-up request occurrence time t1 is possible, as shown by the broken line in FIG. 4, the warm-up of the battery 1 is not started yet at the warm-up request occurrence time t1, even at the charge start time t2.

As a consequence, the battery temperature Tbat continues lowering also after the warm-up request occurrence time t1 as shown by the broken line in FIG. 4. Then, because of this battery temperature Tbat lowering, an internal resistance of the battery 1 remains great as shown by the broken line in FIG. 4.

For this reason, a charge current after the charge start time t2 at which the vehicle travels up to the battery charging facility by battery drive and the battery charger 7 is connected to the external power supply is small as shown by the broken line in FIG. 4. Thus, as is clear from an increase line, shown by the broken line, of the battery charge state SOC after time t2, it is not possible to charge the battery 1 quickly, then a problem that it takes a long time to charge the battery 1 can not be avoided.

In contrast to this, in the present embodiment, at time t1 in FIG. 4, step S21 selects step S22 in FIG. 3, and at this step S22, the warm-up permission judging value of the battery charge state SOC is set to SOCs_low that is substantially 0 (zero). The above problem can therefore be avoided as follows.

That is, since the warm-up permission judging value of the battery charge state SOC is set to SOCs_low that is substantially 0 (zero), "SOC≥SOCs_Low (≈0)" is judged at step S22.

Further, at next step S23, in response to this judging result, the warm-up permission flag FLAG is set to "1", and the warm-up of the battery 1 by the heater 2 at step S19 in FIG. 2 is permitted.

Hence, in the present embodiment, as shown each solid line in FIG. 4, the heater 2 is driven (ON) by the battery from the warm-up request occurrence time t1 according toe "Tbat<Tbat_start", the battery temperature Tbat can therefore be increased from time t1 as shown by the solid line in FIG. 4.

With this increase of the battery temperature Tbat as shown by the solid line, an internal resistance, shown by the solid line, of the battery 1 is decreased as compared with that at the warm-up request occurrence time t1.

As a result, a charge current after the charge start time t2 at which the vehicle travels up to the battery charging facility by battery drive and the battery charger 7 is connected to the external power supply is large as shown by the solid line in FIG. 4. Thus, as is clear from an increase line, shown by the solid line, of the battery charge state SOC after time t2, it is possible to charge the battery 1 quickly. The time required to charge the battery 1 can therefore be shortened.

The invention claimed is:

1. A battery temperature control device that controls a temperature of a battery by warming up the battery by a battery-driven heater on condition that when the battery temperature is less than a predetermined temperature, a charge state of the battery is a setting battery charge state for a battery warm-up permission, wherein battery warm up is permitted when a battery charge state is judged to be equal to or greater than the setting battery charge state, the battery temperature control device programmed to:
- judge whether or not a current battery state is in such battery state that a charge-capable condition of the battery exists; and
- when the battery state in which the charge-capable condition of the battery exists is judged by the battery temperature control device, decrease the setting battery charge state.

2. The battery temperature control device as claimed in claim 1, wherein:
- the battery temperature control device is programmed to decrease the setting battery charge state to substantially 0.

3. The battery temperature control device as claimed in claim 1, wherein:
- the battery is a battery that supplies a travel energy of a vehicle, and
- the battery temperature control device is programmed to judge whether or not the battery state is such battery state as to allow the vehicle to travel by a travel distance required to secure the charge-capable condition of the battery.

4. The battery temperature control device as claimed in claim 3, wherein:
- the travel distance required to secure the charge-capable condition of the battery is a travel distance up to a nearest battery charging facility.

* * * * *